United States Patent
Malshe et al.

(10) Patent No.: US 10,956,053 B2
(45) Date of Patent: Mar. 23, 2021

(54) SELECTIVE RELOCATION OF DATA OF A SUBSET OF A DATA BLOCK BASED ON DISTRIBUTION OF RELIABILITY STATISTICS

(71) Applicant: Micron Technology, Inc., Boise, ID (US)

(72) Inventors: Ashutosh Malshe, Fremont, CA (US); Kishore Kumar Muchherla, Fremont, CA (US); Vamsi Pavan Rayaprolu, San Jose, CA (US); Harish R. Singidi, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 156 days.

(21) Appl. No.: 16/209,007

(22) Filed: Dec. 4, 2018

(65) Prior Publication Data
US 2020/0174681 A1    Jun. 4, 2020

(51) Int. Cl.
*G06F 3/00* (2006.01)
*G06F 3/06* (2006.01)
*G06F 16/23* (2019.01)

(52) U.S. Cl.
CPC .......... *G06F 3/0619* (2013.01); *G06F 3/0655* (2013.01); *G06F 3/0679* (2013.01); *G06F 16/2365* (2019.01)

(58) Field of Classification Search
None
See application file for complete search history.

(56) References Cited

U.S. PATENT DOCUMENTS

| | | | |
|---|---|---|---|
| 5,828,672 A * | 10/1998 | Labonte | H04L 1/0057 714/708 |
| 8,694,854 B1 * | 4/2014 | Dar | G11C 11/5642 714/752 |
| 9,013,920 B2 * | 4/2015 | Stoev | G11C 16/3454 365/185.09 |
| 9,026,869 B1 * | 5/2015 | Li | G06F 11/1004 714/718 |
| 2004/0196921 A1 * | 10/2004 | Matsumoto | H04L 27/38 375/285 |
| 2008/0291988 A1 * | 11/2008 | Qi | H04L 1/24 375/224 |
| 2015/0006976 A1 * | 1/2015 | Jeon | G06F 11/0751 714/54 |
| 2019/0056994 A1 * | 2/2019 | Shulkin | G11C 29/52 |

(Continued)

OTHER PUBLICATIONS

N. R. Mielke, R. E. Frickey, I. Kalastirsky, M. Quan, D. Ustinov and V. J. Vasudevan, "Reliability of Solid-State Drives Based on NAND Flash Memory," in Proceedings of the IEEE, vol. 105, No. 9, pp. 1725-1750, Sep. 2017, doi: 10.1109/JPROC.2017.2725738. (Year: 2017).*

*Primary Examiner* — Daniel F. McMahon
(74) *Attorney, Agent, or Firm* — Lowenstein Sandler LLP (57) ABSTRACT

A data integrity check is performed on a data block of the memory component to obtain a reliability statistic for each of a set of sampled memory cells in the data block. A distribution statistic is determined based on the reliability statistic for each of the set of sampled memory cells. A subset of the data block is identified to be relocated to another data block of the memory component based on the distribution statistic. Data of the subset of the data block is relocated to the other data block.

20 Claims, 9 Drawing Sheets

(56) References Cited

U.S. PATENT DOCUMENTS

2019/0140660 A1* 5/2019 Palangappa .......... G06F 11/1068
2019/0206491 A1* 7/2019 Banerjee ............ G11C 13/0016
2020/0081648 A1* 3/2020 Bernat ................. G06F 3/0604

* cited by examiner

SELECTIVE RELOCATION OF DATA OF A SUBSET OF A DATA BLOCK BASED ON DISTRIBUTION OF RELIABILITY STATISTICS

TECHNICAL FIELD

Embodiments of the disclosure relate generally to memory systems, and more specifically, relate to selective relocation of data of a subset of a data block based on distribution of reliability statistics.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to selectively relocating data of a subset of a data block based on distribution of reliability statistics. A memory sub-system is also hereinafter referred to as a "memory device". An example of a memory sub-system is a storage system, such as a solid-state drive (SSD). In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

A memory component of a conventional memory sub-system can include memory cells that can include one or more memory pages (also referred to as "pages" hereafter) for storing one or more bits of binary data corresponding to data received from the host system. One or more memory cells of the memory component can be grouped together to form a data block. When data is written to a memory cell of the memory component for storage, the memory cell can deteriorate. Accordingly, each memory cell of the memory component can have a finite number of write operations performed on the memory cell before the memory cell is no longer able to reliably store data. Data stored at the memory cells of the memory component can be read from the memory component and transmitted to a host system. However, when data is read from a memory cell of the memory component, nearby or adjacent memory cells can experience what is known as read disturb. Read disturb is the result of continually reading from one memory cell without intervening erase operations, causing other nearby memory cells to change over time (e.g., become programmed). If too many read operations are performed on a memory cell, data stored at adjacent memory cells of the memory component can become corrupted or incorrectly stored at the memory cell. This can result in a higher error rate of the data stored at the memory cell. This can increase the use of an error detection and correction operation (e.g., an error control operation) for subsequent operations (e.g., read and/or write) performed on the memory cell. The increased use of the error control operation can result in a reduction of the performance of the conventional memory sub-system. As more resources of the memory sub-system are used to perform the error control operation, fewer resources can be used to perform other read operations or write operations.

The error rate associated with data stored at the data block can increase due to read disturb. Therefore, upon a threshold number of read operations being performed on the data block, a conventional memory sub-system can perform the data integrity check to verify that the data stored at the data block does not include any errors. During the data integrity check, one or more reliability statistics are determined for data stored at the data block. One example of a reliability statistic is residual bit error rate (RBER). The RBER corresponds to a number of bit errors per unit of time that the data stored at the data block includes an error.

Conventionally, if the reliability statistic for a data block exceeds a threshold value, indicating a high error rate associated with data stored at the data block due, at least in part, to read disturb, then the data stored at the data block is relocated to a new data block of the memory sub-system (also referred to as "folding" hereafter). The folding of the data stored at the data block to the other data block can include writing the data stored at the data block to the other data block to refresh the data stored by the memory sub-system. This can be done to negate read disturb associated with the data and erase the data at the data block. However, as previously discussed, read disturb can affect memory cells that are adjacent to the memory cell that a read operation is performed on. Therefore, read disturb can induce a non-uniform stress on memory cells of the data block if particular memory cells are read from more frequently. For example, memory cells of a data block that are adjacent to a memory cell that is frequently read from can have a high error rate, while memory cells that are not adjacent to the memory cell can have a lower error rate due to a reduced impact by read disturb on these memory cells.

Relocating all of the data stored at the data block to another data block of the memory sub-system results in relocating data from memory cells having a high error rate (e.g., memory cells significantly impacted by read disturb) as well as data from memory cells having a lower error rate (e.g., memory cells not significantly impacted by read disturb). This results in the performance of excessive relocation operations by the memory sub-system. Resources of the memory sub-system are used to relocate additional data (e.g., data from memory cells having a lower error rate) that has been relatively unaffected by read disturb. This can result in a decrease of performance of the memory sub-system and increase the power consumption of the memory sub-system. Furthermore, as previously discussed, each memory cell of a memory component can have a finite number of write operations performed on the memory cell before the memory cell can no longer reliably store data. Therefore, the performance of excessive relocation operations increases the number of write operations performed on memory cells of the memory component. This can decrease the lifespan of the memory sub-system.

Aspects of the present disclosure address the above and other deficiencies by selectively relocating data of a subset of a data block based on distribution of reliability statistics. A data integrity check is performed on a data block of a memory component to obtain a reliability statistic for a set of sampled memory cells in the data block. The reliability statistic can correspond to an error rate for data stored at the set of sampled memory cells. In an embodiment, the reliability statistic can correspond to RBER for data stored at the set of sampled memory cells. Various embodiments described herein are directed to scanning a block to determine a health of a block in terms of reliability statistics. A good indicator of the health of the block is measured in terms of RBER; although in other implementations other metrics at the physical level or at the logical level, such as block usage, could be used to determine a health of the block. Using RBER as the reliability statistic and the distribution of RBER at a smaller granularity than the block are helpful in determining uniformity or non-uniformity of read disturb stress on a set of sampled memory cells. When the read disturb stress is non-uniform, the affected portions of the block can be folded, whereas the non-affected portions of the block are not folded. In embodiments, the set of sample memory cells can correspond to one or more memory cells of the memory component, a word line of the memory component, or a group (e.g., two or more) of word lines of the memory component. A distribution statistic is determined using the reliability statistic for each of the set of sampled memory cells. Examples of distribution statistics can include maximum-minimum delta, maximum-average delta, standard deviation, skewness, z-score, maximum-average, maximum-minimum average, (3rd quartile—median)>>(median—1st quartile), skewness coefficient, or any other relevant distribution statistics. Other potential mechanisms that could result in non-uniformity of RBER distribution statistics include relative age of data written in a block (data retention), localized defect in the block, or the like. The distribution statistic for the set of sampled memory cells can indicate the uniformity or non-uniformity of read disturb stress on the memory cells of the data block. For example, a set of sampled memory cells having a more narrow range of distribution statistics, such as a smaller standard deviation, can indicate a uniform read disturb stress. In another example, a set of sampled memory cells having a more broad range of distribution statistics can indicate a non-uniform read disturb stress.

The distribution statistics are used to identify a subset of the data block that is to be relocated to another data block of the memory component. For example, if the distribution statistics indicate a non-uniform read disturb stress that has affected a group of three word lines of a data block, while having a minimal effect on other word lines of the data block, then the three word lines of the data block can be identified to be relocated to the other data block. Upon identifying the subset of the data block that is to be relocated, the data stored at the subset of the data block is relocated to the other data block without relocating data stored at the remaining portion of the data block. For example, data stored at the three word lines of the data block that was affected by the non-uniform read disturb stress can be relocated to the other data block, while the remaining data stored at the data block remains at the initial data block. The selective pages/wordlines/cells in a block to be folded can be based on RBER threshold comparisons as described herein. Alternatively, the detected pages/wordlines/cells that are marginal to the RBER threshold can trigger preemptive handling based on the RBER threshold comparison.

Advantages of the present disclosure include, but are not limited to, reducing the number of excessive relocation operations performed by the memory sub-system. The number of relocation operations performed is reduced by relocating data stored at memory cells affected by read disturb stress based on the distribution of reliability statistics. Since the number of relocation operations is reduced, the amount of resources of the memory sub-system devoted to performing the relocation operations is also reduced. This can result in an improvement of performance of the memory sub-system and a decrease in power consumption by the memory sub-system. Furthermore, reducing the number of excess relocation operations performed by the memory sub-system can result in a reduction of the number of write operations performed on memory cells of the memory sub-system. This can increase the lifespan of the memory sub-system. Although embodiments are described using memory cells of a NAND flash memory, aspects of the present disclosure can be applied to other types of memory components. Furthermore, although embodiments are described to determine distribution statistics at a finer granularity (e.g., the set of sampled memory cells) for a data block, aspects of the present disclosure can be applied to determine distribution statistics at a broader granularity for a data block to reduce the amount of storage of the memory sub-system being dedicated to the storage of distribution statistics. For example, distribution statistics can be determined for multiple data blocks (also referred to as a "super block").

Figure 1:
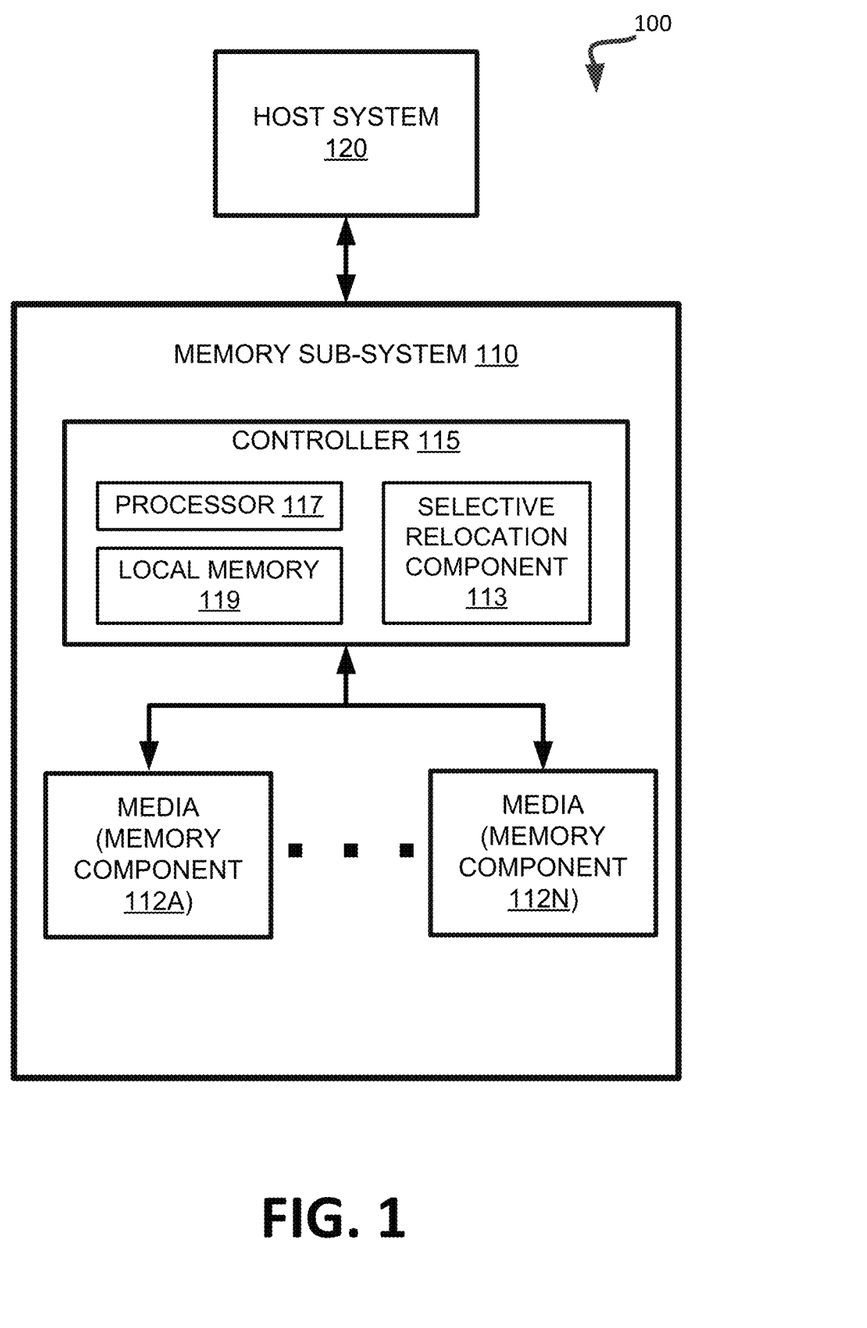
FIG. 1 illustrates an example computing environment that includes a memory sub-system in accordance with some embodiments of the present disclosure.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/ storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a selective relocation component 113 that can be used to relocate data of a subset of a data block to another data block based on distribution of reliability statistics. In some embodiments, the controller 115 includes at least a portion of the selective relocation component 113. For example, the controller 115 can include a processor 117 (processing device) configured to execute instructions stored in local memory 119 for performing the operations described herein. In some embodiments, the selective relocation component 113 is part of the host system 110, an application, or an operating system.

The selective relocation component 113 can perform a data integrity check on a data block of a memory component to obtain a reliability statistic for each of a set of sampled memory cells in the data block. The selective relocation component 113 can determine a distribution statistic based on the reliability statistic for each of the set of sampled memory cells. The selective relocation component 113 can further identify a subset of the data block to be relocated to another data block of the memory component based on the distribution statistic. The selective relocation component 113 can relocate data stored at the subset of the data block to the other data block. Further details with regards to the operations of the selective relocation component 113 are described below.

Figure 2:
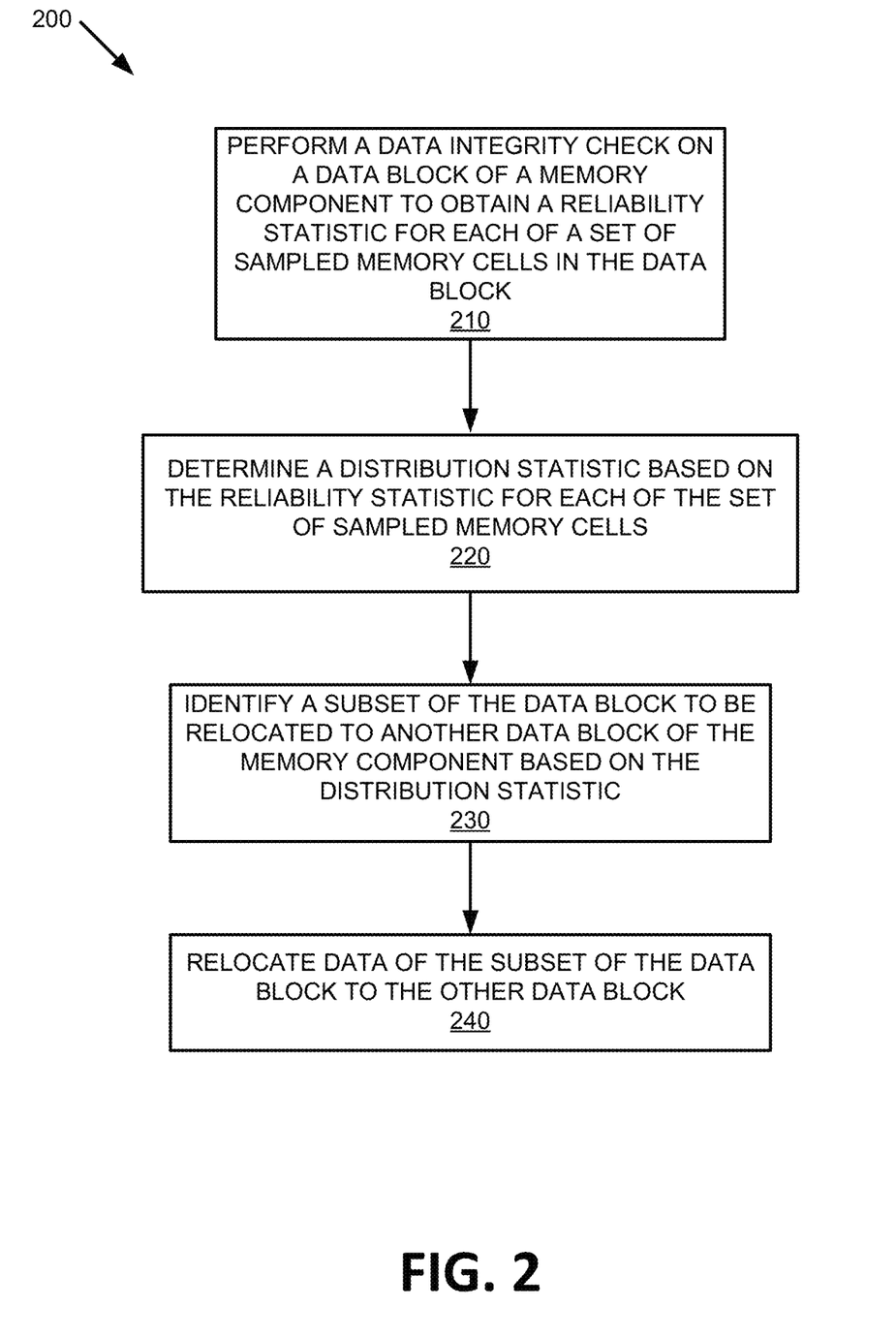
FIG. 2 is a flow diagram of an example method to relocate data stored at a subset of a data block to another data block based on a distribution statistic, in accordance with some embodiments of the present disclosure.

FIG. 2 is a flow diagram of an example method 200 to relocate data stored at a subset of a data block to another data block based on a distribution statistic, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the selective relocation component 113 of FIG. 1.

At block 210, a data integrity check is performed on a data block of a memory component to obtain a reliability statistic for each of a set of sampled memory cells in the data block. The data integrity check can verify that data stored at the data block does not include any errors. In embodiments, the data integrity check can include reading data from the set of sampled memory cells in the data block. Upon reading the data from the set of sampled memory cells, an error correction operation can be performed on the read data. In some implementations, the error correction operation can be an error-correcting code (ECC) operation or another type of error detection and correction operation to detect and correct an error. During the error correction operation one or more reliability statistics, such as RBER, can be determined for the data read from the set of sampled memory cells. In embodiments, the set of sampled memory cells in the data block can be one or more memory cells of the data block, a word line, a group of word lines in the data block, or any combination thereof. For example, the set of sampled memory cells can be a group of three word lines in the data block.

At block 220, a distribution statistic is determined based on the reliability statistic from each of the set of sampled memory cells. The distribution statistic can be indicative of the uniformity or non-uniformity of read disturb stress on memory cells in the data block. For example, a set of sampled memory cells having a more narrow range of distribution statistics, such as a smaller standard deviation, can indicate a uniform read disturb stress. In another example, a set of sampled memory cells having a more broad range of distribution statistics can indicate a non-uniform read disturb stress. Examples of distribution statistics can include maximum-minimum delta, maximum-average delta, standard deviation, skewness or any other relevant distribution statistics.

In embodiments, the maximum-minimum delta distribution statistic can correspond to a difference between the highest value (e.g., maximum) reliability statistic of the set of sampled memory cells and the lowest value (e.g., minimum) reliability statistic of the set of sampled memory cells. The maximum-average delta distribution statistic can correspond to a difference between the highest value reliability statistic of the set of sampled memory cells and the average value of the sum of the reliability statistics for the set of sampled memory cells. The standard deviation can correspond to a measure of variation in the reliability statistics for the set of sampled memory cells. The skewness can correspond to a measure of the asymmetry of the distribution of the reliability statistics for the set of sampled memory cells.

At block 230, a subset of the data block to be relocated to another data block of the memory component is identified based on the distribution statistic determined at block 220. As previously discussed, the distribution statistic can indicate the distribution of read disturb stress in the data block. In an embodiment, the distribution statistic can indicate a non-uniform distribution of read disturb stress on the data block, where the read disturb stress is concentrated on memory cells in a particular region of the data block. For example, a high skewness factor, a large standard deviation, a large maximum-minimum delta, a large z-score, and/or large maximum-average delta can indicate a non-uniform distribution of the read disturb stress on the data block. Also, some relative metrics can be used for indicating a high disparity in the RBER distribution for a subset of memory cells in the block. If the distribution statistic indicates a non-uniform read disturb stress, the identified subset of the data block to be relocated can correspond to the particular region of the data block that the read disturb stress is concentrated on. For example, the identified subset to be relocated can correspond to a memory cell, word line or group of word lines in the data block that the read disturb stress is concentrated on.

In embodiments, the distribution statistic can indicate a uniform distribution of read disturb stress on the data block, where the read disturb stress is more evenly distributed throughout memory cells of the data block. For example, a low skewness factor, a low standard deviation, a small maximum-minimum delta, a low z-score, and/or small maximum-average delta can indicate a uniform distribution of the read disturb stress on the data block. Since a uniform distribution of read disturb stress indicates a larger portion of the data block is affected by read disturb stress, if the distribution statistic indicates a uniform read disturb stress, the identified subset of the data block to be relocated can correspond to a larger portion of the data block than if the read disturb distribution was non-uniform. For example, the identified subset to be relocated can correspond to multiple memory cells, word lines or groups of word lines in the data block. In an embodiment, the subset of the data block to be relocated can be identified in response to determining the distribution statistic satisfies a distribution statistic threshold criterion, as will be discussed in more detail below.

At block 240, data stored at the subset of the data block identified at block 230 is relocated to the other data block. Data stored at the subset of the data block can be read from the memory cells in the subset of the data block and written to the other data block. In embodiments, once the data has been written to the other data block, the data stored at the subset of the initial data block is erased and the subset of the data block is available to be programmed with new data. In embodiments, the data stored at the subset of the data block is relocated to the other data block without relocating other data stored at the remaining portion of the data block that has not been identified. In an embodiment, the data stored at the subset of the data block can be relocated to another data block of the same memory component. In some embodiments, the data stored at the subset of the data block can be relocated to another data block at a different memory component of the memory sub-system.

Figure 3:
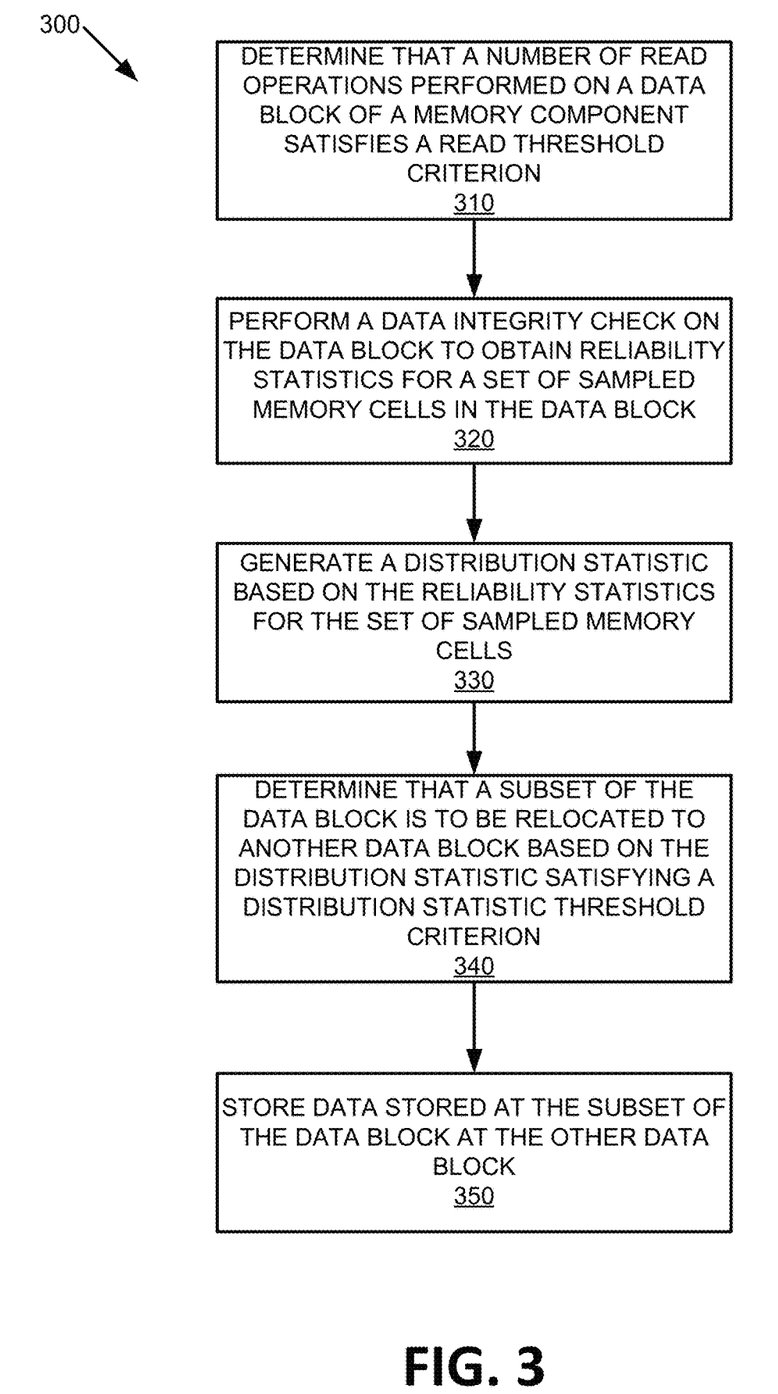
FIG. 3 is a flow diagram of an example method to perform a data integrity check based on a number of read operations satisfying a read threshold criterion, in accordance with some embodiments of the present disclosure.

FIG. 3 is a flow diagram of an example method 300 to perform a data integrity check based on a number of read operations satisfying a read threshold criterion, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the selective relocation component 113 of FIG. 1.

At block 310, a number of read operations performed on a data block of a memory component is determined to satisfy a read threshold criterion. The impact of read disturb stress on memory cells of a data block increases as the number of read operations performed on the data block increases. Therefore, the number of read operations performed on memory cells in the data block of the memory component is monitored to determine whether the number of read operations performed on memory cells of the data block satisfies the read threshold criterion. The read threshold criterion can correspond to the number of read operations that can be performed on memory cells of a data block before read disturb stress can begin to impact data stored at memory cells of the data block.

At block 320, upon determining that the number of read operations performed on the data block satisfies the read threshold criterion, a data integrity check is performed on the data block to obtain reliability statistics for a set of sampled memory cells in the data block. In embodiments, the data integrity check can include performing an error correction operation, as previously discussed. During the data integrity check, reliability statistics can be generated for a set of sampled memory cells in the data block. In embodiments, the set of sampled memory cells can correspond to one or more memory cells, a word line or a group of word lines in the data block. In embodiments, the reliability statistics can correspond to RBER for data stored at the set of sampled memory cells.

At block 330, a distribution statistic is generated based on the reliability statistics for the set of sampled memory cells. The distribution statistic can be indicative of the distribution of read disturb stress over the data block, as previously discussed. At block 340, a subset of the data block is determined to be relocated to another data block based on the distribution statistic satisfying distribution statistic threshold criterion. In an embodiment, the distribution statistic satisfying the threshold criterion can indicate a non-uniform distribution of read disturb stress that affects a particular subset of the data block. For example, the standard deviation associated with the RBER of a word line of the data block can satisfy a threshold criterion and indicate that the word line has been affected by non-uniform read disturb stress. Accordingly, a determination can be made to relocate the word line based on the standard deviation of the word line satisfying the threshold criterion. In embodiments, the distribution statistic satisfying the threshold criterion can indicate a uniform distribution of read disturb stress that affects a larger subset of the data block when compared to non-uniform distribution of read disturb stress. For example, the maximum-average delta associated with the RBER of a group of word lines or multiple groups of word lines can satisfy a threshold criterion and indicate that the group or multiple groups of words lines have been affected by uniform read disturb stress. Accordingly, a determination can be made to relocate the group or multiple groups of word lines based on the maximum-average delta of the group or multiple groups of word lines satisfying the threshold criterion.

At block 350, data that is stored at the subset of the data block is stored at the other data block. In embodiments, the other data block can be located in the same memory component as the initial data block. In an embodiment, the other data block can be located in another memory component of the memory sub-system. In embodiments, upon storing the data at the other data block, the data stored at the initial data block can be erased. In some embodiments, a second subset of the data block can be identified that has been minimally impacted by read disturb stress. For example, if the distribution of the read disturb stress is non-uniform and the read disturb stress is concentrated on one group of word lines of a data block while another group of word lines of the data block is minimally affected by the read disturb stress, then the other group of word lines that is minimally affected by the read disturb stress can be identified. Accordingly, a determination can be made to not store data stored at the other group of word lines that is minimally affected by the read disturb stress at the other data block.

Figure 4A:
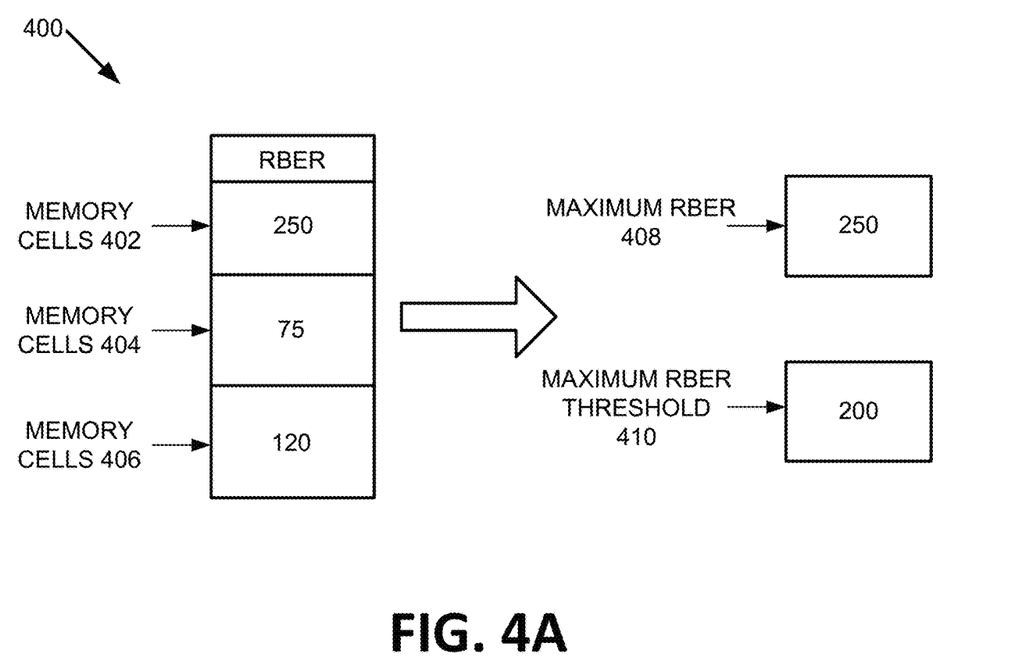
FIG. 4A illustrates analyzing reliability statistics for each of a set of sampled memory cells of a data block, in accordance with an embodiment of the present disclosure.

FIG. 4A illustrates analyzing reliability statistics for each of a set of sampled memory cells 400 of a data block, in accordance with an embodiment of the present disclosure. The set of sampled memory cells 400 can include memory cells 402, 404, 406. In embodiments, memory cells 402, 404, 406 can correspond to one or more memory cells in a data block, a word line in a data block or a group of word lines in a data block. Each of memory cells 402, 404, 406 can have a corresponding reliability statistic (e.g., RBER) obtained during a data integrity check, as previously discussed. In the present illustration, memory cells 402 have a corresponding RBER of 250, memory cells 404 have a corresponding RBER of 75 and memory cells 406 have a corresponding RBER of 120.

In embodiments, the maximum RBER 408 from the set of sampled memory cells 400 is compared to a maximum RBER threshold criterion 410 to determine whether the data block or a subset of the data block is to be relocated to another data block. If the maximum RBER 408 from the set of sampled memory cells 400 satisfies the maximum RBER threshold criterion 410, then the data block or a subset of the data block is to be relocated to another data block. In the present illustration, the maximum RBER 408 is 250 and the maximum RBER threshold criterion 410 is 200. Thus, the maximum RBER 408 satisfies the maximum RBER threshold criterion 410 and the data block or a subset of the data block is to be relocated to another data block. Upon determining that the data block or the subset of the data block is to be relocated, distribution statistics can be used to identify one or more subsets of the data block that are to be relocated.

Figure 4B:
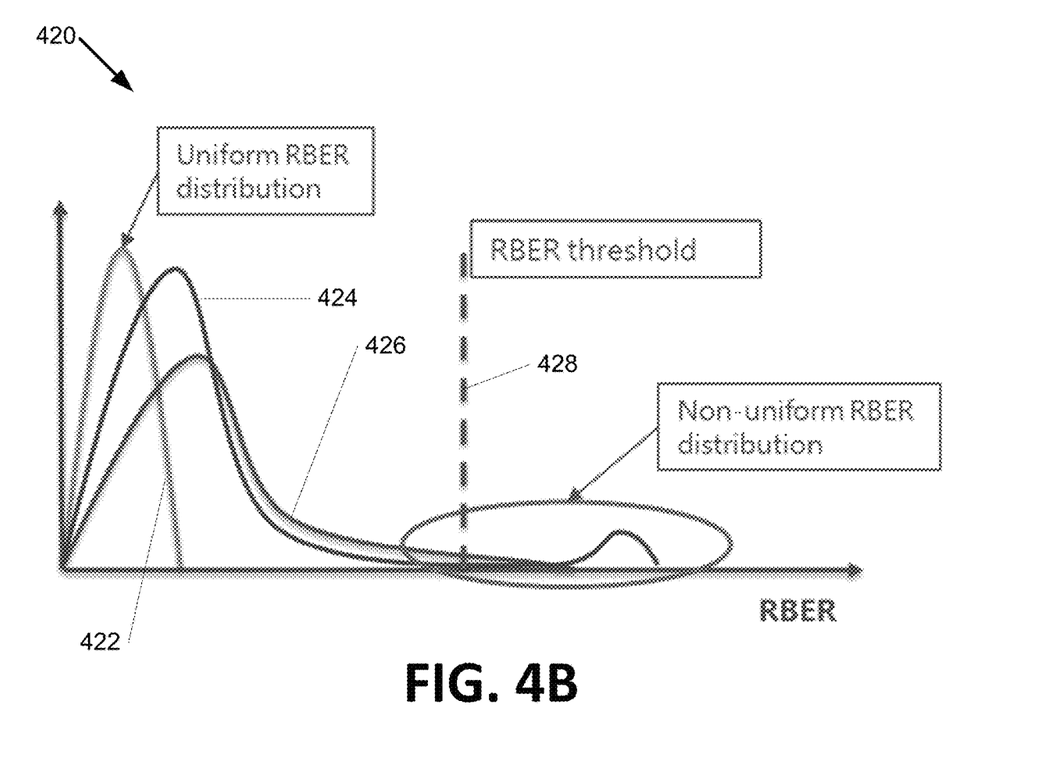
FIG. 4B is a graph illustrating examples of RBER distributions for a set of sampled cells of a data block, in accordance with an embodiment of the present disclosure.

FIG. 4B is a graph 420 illustrating examples of RBER distributions for a set of sampled cells of a data block, in accordance with an embodiment of the present disclosure. A first distribution 422 is a uniform RBER distribution. A second distribution 424 is a first type of non-uniform RBER distribution and a third distribution 428 is a second type of non-uniform RBER distribution. The first distribution 422 has a tight distribution and the RBER values of the cells, pages, or wordlines of the block are below a RBER threshold 428 (threshold criterion). As a result of its uniformity and being less than the RBER threshold 428, the block would not be folded.

The second distribution 424 is a non-uniform distribution with a first portion that is less than the RBER threshold 428 and a second portion that is separated and non-uniform with the first portion. The second portion is a tail of the first portion of the second distribution 424 that exceeds the RBER threshold 428 and includes outliers that cause a smaller distribution that is separate from the larger distribution of the first portion. The second portion of the second distribution 424 is also greater than the RBER threshold 428. As a result of its non-uniformity and having the second portion being greater than the RBER threshold 428, some of the block can be folded. In particular, the underlying cells, pages, or wordlines, according to the granularity used for the distribution, of the second portion that exceeds the RBER threshold 428 can be folded, whereas the underlying cells, pages, or wordlines that do not exceed the RBER threshold 428 are not folded, resulting in a partial fold of the block.

The third distribution 426 is a non-uniform distribution with a first portion that is less than the RBER threshold 428 and a second portion that is greater than the RBER threshold 428. As a result of its non-uniformity and having the second portion being greater than the RBER threshold 428, some of the block can be folded. In particular, the underlying cells, pages, or wordlines, according to the granularity used for the distribution, of the second portion that exceed the RBER threshold 428 can be folded, whereas the underlying cells, pages, or wordlines that do not exceed the RBER threshold 428 are not folded, resulting in a partial fold of the block.

As described above, the second distribution 424 and the third distribution 426 include a portion of the block that results in a non-uniform RBER distribution 430. Using the RBER distributions, the processing device can identify the underlying cells/pages/wordlines corresponding to the non-uniform RBER distribution 430 and can fold them. In some cases, all the underlying cells/pages/wordlines having an RBER value exceeding the RBER threshold 428 can be folded. In other cases, additional underlying cells/pages/wordlines having an RBER value that does not exceed the RBER threshold 428 can also be folded, such as illustrated and described below with respect to FIG. 4C.

Figure 4C:
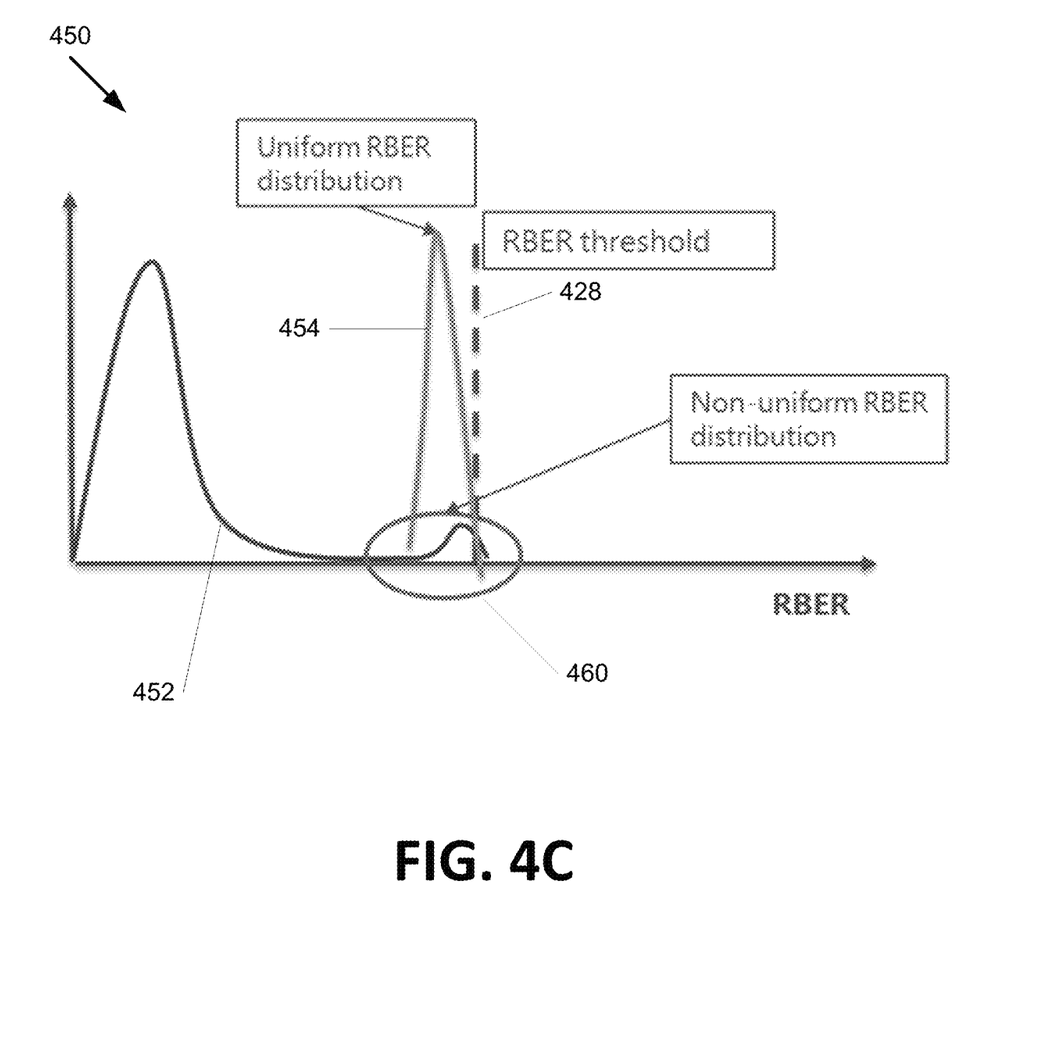
FIG. 4C is a graph illustrating examples of RBER distributions for a set of sampled cells of a data block, in accordance with an embodiment of the present disclosure.

FIG. 4C is a graph 450 illustrating examples of RBER distributions for a set of sampled cells of a data block, in accordance with an embodiment of the present disclosure. A fourth distribution 452 is a third type of non-uniform RBER distribution and a fifth distribution 454 is a fourth type of non-uniform RBER distribution. The fourth distribution 452 is a non-uniform distribution with a first portion and a second portion that is separated and non-uniform with the first portion. The second portion is a tail of the first portion of the fourth distribution 452 and includes outliers that cause a smaller distribution that is separate from the larger distribution of the first portion. The second portion of the fourth distribution 452, however, does not exceed the RBER threshold 428. Even though the second portion does not exceed the RBER threshold 428, the fourth distribution 452 can be identified as non-uniform and a portion of the block can be folded. For example, the underlying cells, pages, or wordlines, according to the granularity used for the distribution, of the second portion that has the smaller, separated distribution can be folded, whereas the underlying cells, pages, or wordlines that correspond to the first portion are not folded, resulting in a partial fold of the block. In another implementation, a range or a percentage from the RBER threshold 428 can be used to identify the cells/pages/wordlines to be folded when there is non-uniformity in the distribution. For example, cells/pages/wordlines having a RBER within 10% of the RBER threshold can be folded when there is non-uniformity in the distribution as illustrated in the fourth distribution 452.

The fifth distribution 454 has a tight distribution and the RBER values of the cells, pages, or wordlines of the block are below a RBER threshold 428. However, given that the fifth distribution 454 is close in proximity to the RBER threshold 428, the block or a portion of the block can still be folded before the block exceeds the RBER threshold 428. As a result of its uniformity and being less than the RBER threshold 426, the block would not be folded. In another implementation, a range or a percentage from the RBER threshold 428 can be used to identify the cells/pages/wordlines to be folded when the entire distribution or a significant portion of the distribution approaches the RBER threshold 428. For example, cells/pages/wordlines having a RBER within 10% of the RBER threshold can be folded when the entire distribution or a significant portion of the distribution is within a percentage or range from the RBER threshold 428 as illustrated in the fifth distribution 452.

As described above, the fourth distribution 452 and the fifth distribution 454 include a portion of the block that results in a non-uniform RBER distribution 460. Using the RBER distributions, the processing device can identify the underlying cells/pages/wordlines corresponding to the non-uniform RBER distribution 460 and can fold them. In other cases, the entire block can be folded. In these particular examples, most or all of the underlying cells/pages/wordlines have an RBER value that does not necessarily exceed the RBER threshold 428 and are still folded.

In embodiments, upon determining that distribution statistics for memory cells 402 exceed one or more distribution statistic thresholds (e.g., delta threshold and/or deviation threshold), a subset of the data block that corresponds to memory cells 402 can be identified for relocation to another data block. For example, if memory cells 402 correspond to a group of word lines in the data block, then the group of word lines can be identified for relocation to another data block.

Figure 5A:
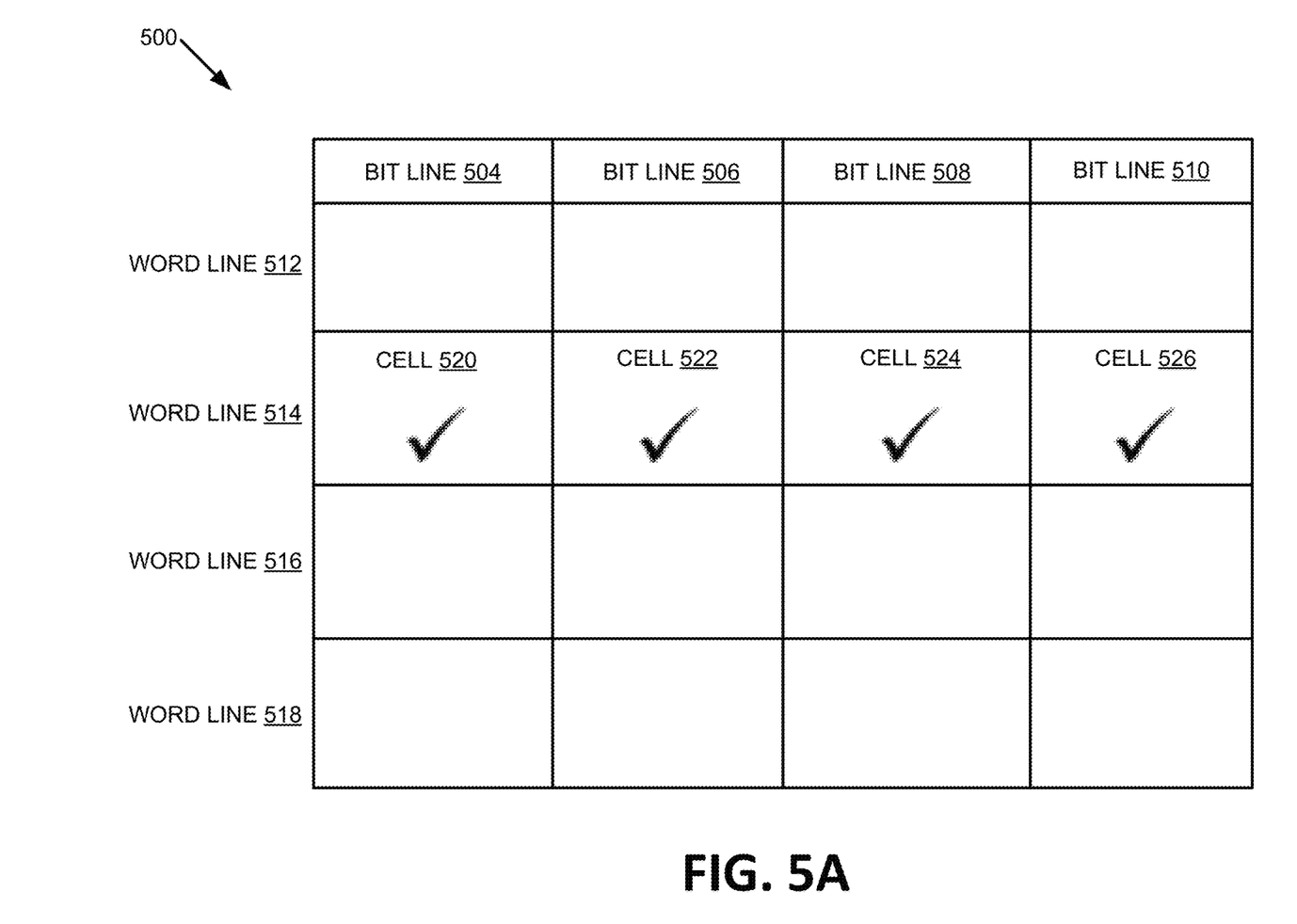
FIG. 5A is an illustration of identifying a word line of a data block to be relocated to another data block, in accordance with an embodiment of the present disclosure.

FIG. 5A is an illustration of identifying a word line of a data block 500 to be relocated to another data block, in accordance with an embodiment of the present disclosure. Data block 500 can be composed of rows of word lines 512, 514, 516, 518 and columns of bit lines 504, 506, 508, 510. At the intersections between a bit line (e.g., bit lines 504, 506, 508, 510) and a word line (e.g., word lines 512, 514, 516, 518) are memory cells (e.g., 520, 522, 524, 526) for storing user data received from a host system. Each of memory cells 520, 522, 524, 526 can include one or more pages for storing user data received from the host system.

In the present illustration, word line 514 has been identified to be relocated to another data block based on determined distribution statistics, as previously described at FIGS. 4A and 4B. For example, the maximum-average delta and/or standard deviation for word line 514 can satisfy a corresponding distribution statistic threshold criterion. Since word line 514 is identified for relocation to another data block, the data stored at cells 520, 522, 524, 526 located on word line 514 is to be relocated to another data block.

Figure 5B:
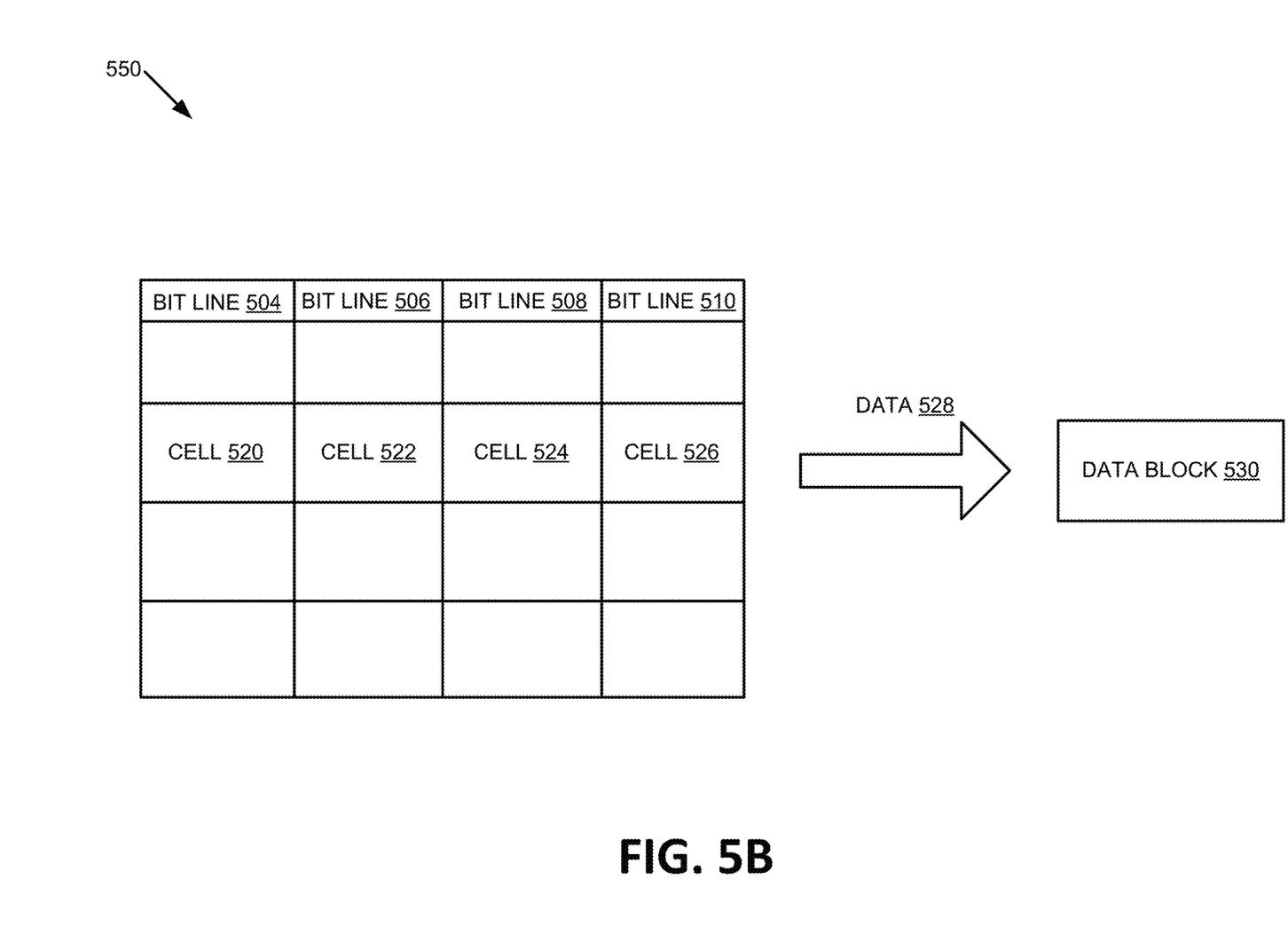
FIG. 5B is an illustration of relocating data stored at the identified word line of the data block to another data block, in accordance with some embodiments of the present disclosure.

FIG. 5B is an illustration of relocating data stored at the identified word line of the data block 550 to another data block, in accordance with some embodiments of the present disclosure. Upon identification of the subset of the data block 550 for relocation (e.g., word line 514 of FIG. 5A), data 528 stored at cells 520, 522, 524, 526 can be read from cells 520, 522, 524, 526 and transmitted to data block 530 (e.g., another data block) for storage. In embodiments, data block 530 can be located in the same memory component as data block 550. In an embodiment, data block 530 can be located in a different memory component of the memory sub-system. In some embodiments, data block 530 can be located in a memory component of another memory sub-system. In embodiments, upon relocating the data 528 to data block 530, data 528 can be erased from cells 520, 522, 524, 526. Cells 520, 522, 524, 526 can then be made available for the storage of new user data received from a host system.

Figure 6:
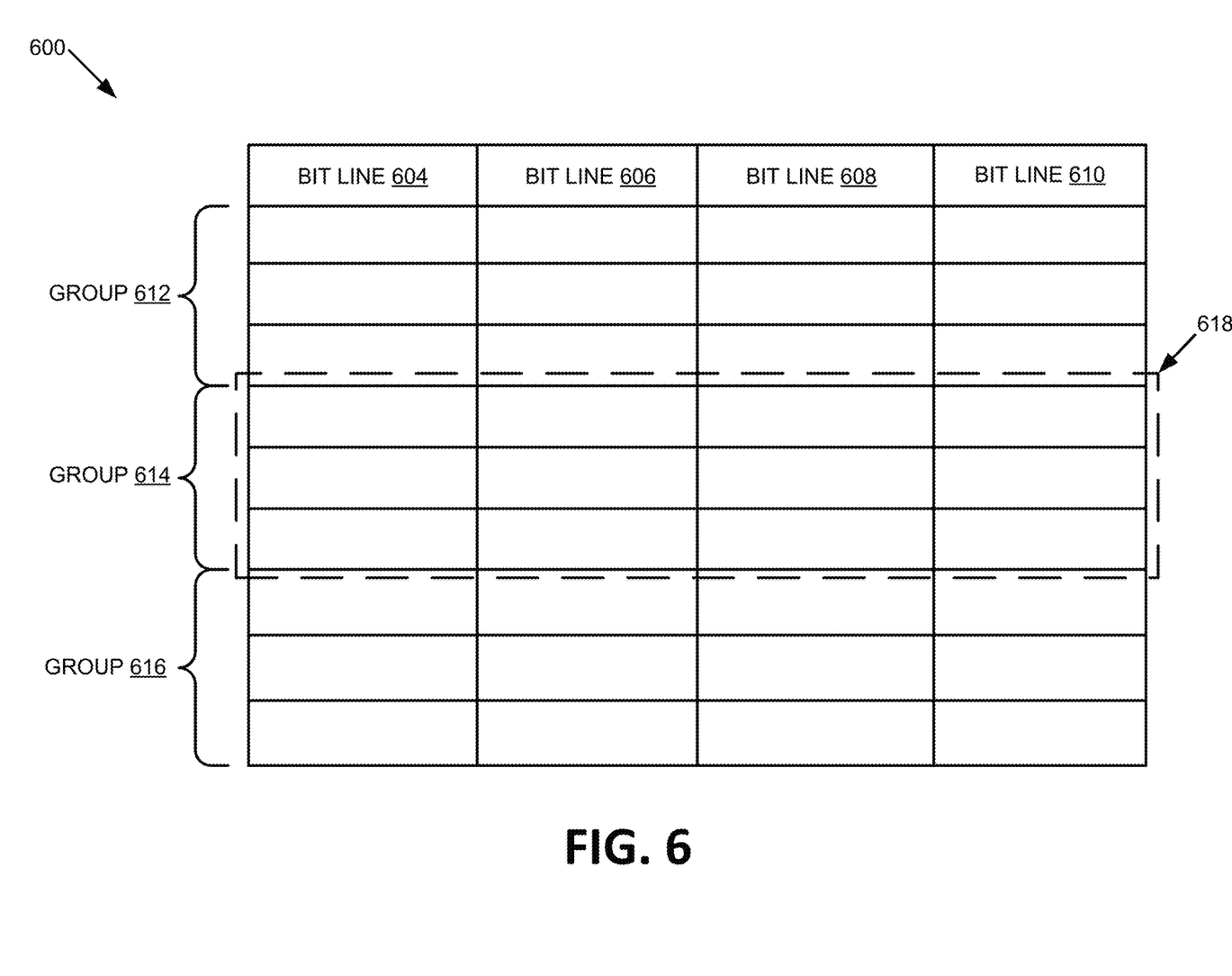
FIG. 6 is an illustration of identifying a group of word lines of a data block to be relocated to another data block, in accordance with embodiments of the present disclosure.

FIG. 6 is an illustration of identifying a group of word lines of a data block 600 to be relocated to another data block, in accordance with embodiments of the present disclosure. Data block 600 can be composed of rows of word lines and columns of bit lines 604, 606, 608, 610. The rows of word lines can be segmented into groups 612, 614, 616 that each includes three word lines of data block 600. Although the present illustration has groups 612, 614, 616 each including three word lines of data block 600, in embodiments a data block can be segmented into any number of groups that can each include any number of word lines. Group 614 includes memory cells 618 that store one or more bits of user data. In the present illustration, group 614 has been identified for relocation to another data block based on distribution statistics, as previously discussed. Accordingly, data stored at the memory cells 618 of group 614 can be relocated to the other data block. In embodiments, upon the data stored at memory cells 618 of group 614 being relocated to the other data block, the data stored at memory cells 618 of group 614 can be erased and new data received from a host system can be stored at memory cells 618.

Figure 7:
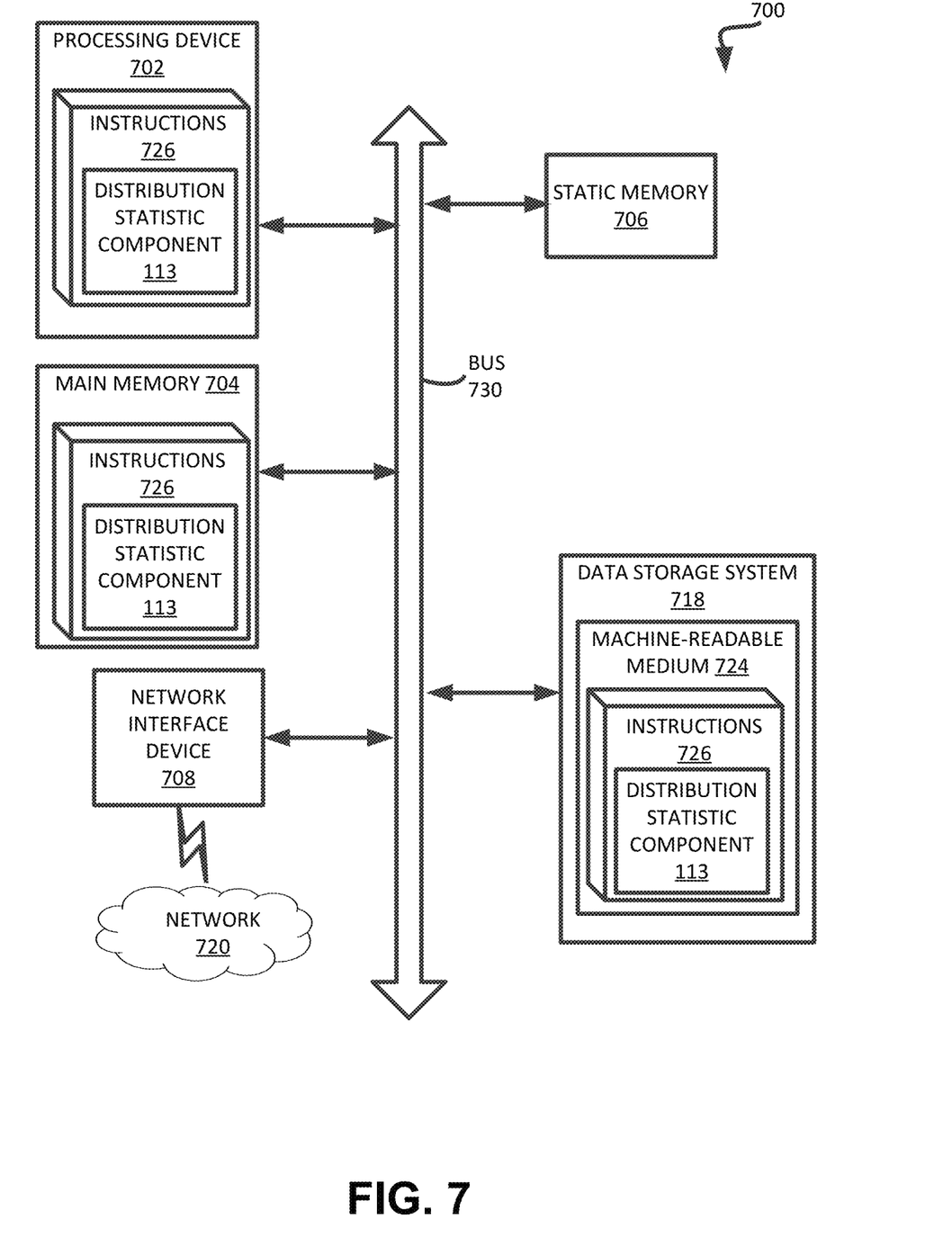
FIG. 7 is a block diagram of an example computer system in which implementations of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the selective relocation component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a selective relocation component (e.g., the selective relocation component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory component; and
a processing device, operatively coupled with the memory component, to:
obtain a reliability statistic for each of a set of sampled memory cells in a data block of the memory component;
determine a distribution statistic based on the reliability statistic for each of the set of sampled memory cells;
determine, based on the distribution statistic, that read disturb stress is concentrated on a subset of the data block; and
relocate data of the subset of the data block to another data block of the memory component.

2. The system of claim 1, wherein the processing device is further to:
determine that a number of read operations performed on the data block satisfies a read threshold criterion, wherein the processing device is to obtain the reliability statistic for each of the set of sampled memory cells in response to determining that the number of read operations satisfies the read threshold criterion.

3. The system of claim 1, wherein to obtain a reliability statistic for each of the set of sampled memory cells, the processing device is to:
perform an error correction operation on second data stored at the subset of the data block.

4. The system of claim 1, wherein the reliability statistic for each of the set of sampled memory cells in the data block correspond to a residual bit error rate (RBER).

5. The system of claim 1, wherein the set of sampled memory cells in the data block comprises at least one of one or more memory cells, a word line, or a group of word lines of the data block.

6. The system of claim 1, wherein, to determine that read disturb stress is concentrated on a subset of the data block, the processing device is to:
determine that the distribution statistic for the data of the subset of the data block satisfies a distribution statistic threshold criterion.

7. The system of claim 1, wherein the memory component comprises NAND flash memory cells.

8. The system of claim 1, wherein the distribution statistic corresponds to a uniformity of read disturb stress in the data block.

9. A method comprising:
determining that a number of read operations performed on a data block of a memory component satisfies a read threshold criterion;
in response to determining the number of read operations performed on the data block of the memory component satisfies the read threshold criterion, obtaining reliability statistics for a set of sampled memory cells in the data block;
generating a distribution statistic based on the reliability statistics for the set of sampled memory cells;
in response to determining that the distribution statistic satisfies a distribution statistic threshold criterion, determining, based on the distribution statistic, that read disturb is concentrated on a subset of the data block; and
storing data stored at the subset of the data block at another data block of the memory component.

10. The method of claim 9, wherein the distribution statistic corresponds to a uniformity of read disturb stress in the data block.

11. The method of claim 9, wherein the set of sampled memory cells in the data block comprises at least one of one or more memory cells, a word line, or a group of word lines of the data block.

12. The method of claim 9, wherein the reliability statistic for each of the set of sampled memory cells in the data block correspond to a residual bit error rate (RBER).

13. The method of claim 12, wherein storing the data stored at the subset of the data block at the other data block further comprises:
identifying second data stored at a second subset of the data block; and
determining to not store the second data at the other data block.

14. The method of claim 9, further comprising:
upon storing the data at the other data block, erasing the data stored at the subset of the data block.

15. A non-transitory computer-readable storage medium comprising instructions that, when executed by a processing device, cause the processing device to:
obtain a reliability statistic for each of a set of sampled memory cells in a data block of a memory component;
determine a distribution statistic based on the reliability statistic for each of the set of sampled memory cells;
determine, based on the distribution statistic, that read disturb stress is concentrated on a subset of the data block; and
relocate data of the subset of the data block to another data block of the memory component.

16. The non-transitory computer-readable storage medium of claim 15, wherein the processing device is further to:
determine that a number of read operations performed on the data block satisfies a read threshold criterion, wherein the processing device is to obtain the reliability statistic for each of the set of sampled memory cells in response to determining that the number of read operations satisfies the read threshold criterion.

17. The non-transitory computer-readable storage medium of claim 15, wherein to obtain a reliability statistic for each of the set of sampled memory cells, the processing device is to:
perform an error correction operation on second data stored at the subset of the data block.

18. The non-transitory computer-readable storage medium of claim 15, wherein the reliability statistic for each of the set of sampled memory cells in the data block correspond to a residual bit error rate (RBER).

19. The non-transitory computer-readable storage medium of claim 15, wherein the set of sampled memory cells in the data block comprises at least one of one or more memory cells, a word line, or a group of word lines of the data block.

20. The non-transitory computer-readable storage medium of claim 15, wherein the distribution statistic based on the reliability statistic for each of the set of sampled memory cells comprises at least one of: maximum-minimum delta, maximum-average delta, standard deviation or skewness.

* * * * *